US011167317B2

United States Patent
McGloughlin et al.

(10) Patent No.: US 11,167,317 B2
(45) Date of Patent: Nov. 9, 2021

(54) METHOD AND APPARATUS FOR HANDLING HARVESTED ROOT CROPS

(71) Applicant: TOMRA SORTING LIMITED, Dublin (IE)

(72) Inventors: John McGloughlin, County Kildare (IE); James Frost, County Roscommon (IE); Maurice Moynihan, Dublin (IE)

(73) Assignee: TOMRA SORTING LIMITED, Dublin (IE)

( * ) Notice: Subject to any disclaimer, the term of this patent is extended or adjusted under 35 U.S.C. 154(b) by 783 days.

(21) Appl. No.: 14/426,578

(22) PCT Filed: Aug. 30, 2013

(86) PCT No.: PCT/EP2013/068031
§ 371 (c)(1),
(2) Date: Mar. 6, 2015

(87) PCT Pub. No.: WO2014/037290
PCT Pub. Date: Mar. 13, 2014

(65) Prior Publication Data
US 2015/0224544 A1    Aug. 13, 2015

(30) Foreign Application Priority Data

Sep. 7, 2012    (IE) .................................... 2012/0388

(51) Int. Cl.
*B07C 5/34*    (2006.01)
*B07C 5/342*    (2006.01)
(Continued)

(52) U.S. Cl.
CPC ................ *B07C 5/342* (2013.01); *B07C 5/10* (2013.01); *G01N 21/359* (2013.01); *G01N 21/85* (2013.01);
(Continued)

(58) Field of Classification Search
CPC ..... B07C 5/10; B07C 5/342; B07C 2501/009; B07C 2501/0018; G01N 21/359; G01N 21/85; G01N 21/8851; G01N 21/8854
(Continued)

(56) References Cited

U.S. PATENT DOCUMENTS 5,157,976 A * 10/1992 Tokoyama ............ B07C 5/3425
                                                            73/865.8
5,253,765 A * 10/1993 Moorehead ............... B07C 5/02
                                                            198/454
(Continued)

FOREIGN PATENT DOCUMENTS

EP        1083007 A2     3/2001
WO   WO 2007/041753 A1  4/2007

OTHER PUBLICATIONS

International Search Report (PCT/ISA/210) dated Nov. 19, 2013, by the European Patent Office as the International Searching Authority for International Application No. PCT/EP2013/068031.

*Primary Examiner* — Charles A Fox
*Assistant Examiner* — Kalyanavenkateshware Kumar
(74) *Attorney, Agent, or Firm* — Buchanan Ingersoll & Rooney P.C.

(57) ABSTRACT

A method for handling harvested root crops such as potatoes. The method includes the steps of optically imaging (i.e., by the hyper-spectral imaging system) a bulk flow of a harvested root crop to produce image data and analysing the image data to identify discrete objects within the bulk flow. Each identified object is categorised as either acceptable or unacceptable based on a comparison with at least one discriminator and objects classified as unacceptable are removed (by the ejector actuator) from the bulk flow to provide a sorted flow of the harvested root crop.

18 Claims, 6 Drawing Sheets

(51) Int. Cl.
*G01N 21/85* (2006.01)
*B07C 5/10* (2006.01)
*G01N 21/359* (2014.01)
*G01N 21/88* (2006.01)
*G01N 21/84* (2006.01)

(52) U.S. Cl.
CPC .... *G01N 21/8851* (2013.01); *B07C 2501/009* (2013.01); *B07C 2501/0018* (2013.01); *G01N 2021/8466* (2013.01); *G01N 2201/04* (2013.01)

(58) Field of Classification Search
USPC ........ 209/576, 577, 586, 587; 382/181, 190, 382/191, 194

See application file for complete search history.

(56) References Cited

U.S. PATENT DOCUMENTS

| | | | |
|---|---|---|---|
| 5,279,426 A | | 1/1994 | Crismon et al. |
| 5,954,206 A | * | 9/1999 | Mallon .................. B07C 5/342 209/580 |
| 6,100,488 A | * | 8/2000 | Satake .................. B07C 5/3425 209/580 |
| 6,610,953 B1 | * | 8/2003 | Tao ........................ B07C 5/342 209/11 |
| 6,629,611 B2 | * | 10/2003 | Satake .................. B07C 5/3425 198/439 |
| 6,646,264 B1 | * | 11/2003 | Modiano .............. G01N 21/359 250/339.07 |
| 8,985,342 B2 | * | 3/2015 | Tanaka .................. B07C 5/3425 209/580 |
| 2012/0031818 A1 | * | 2/2012 | Frost ...................... B07C 5/368 209/555 |
| 2012/0074047 A1 | | 3/2012 | Deefholts |
| 2013/0028487 A1 | * | 1/2013 | Stager .................... B07C 5/342 382/110 |

* cited by examiner

METHOD AND APPARATUS FOR HANDLING HARVESTED ROOT CROPS

FIELD OF THE INVENTION

The present invention relates to handling harvested root crops, and in particular to sorting harvested root crops such as potatoes to remove foreign material such as stones and dirt clods.

BACKGROUND TO THE INVENTION

Potatoes, onions and other root crops are harvested and typically stored for several months for later processing and consumption. During the harvesting process, the crop is mechanically dug from the field, resulting in stones, dirt clods and other foreign material being included with the harvested product, which itself is typically covered in dirt. Storage of such foreign material is undesirable for a number of reasons. Firstly, it increases the cost of transport, storage and environment management of the crops. A further problem is that the foreign material can damage the crops while in storage, and during transport into and out of the storage facility. Material such as stones may also damage equipment used to process the crops after storage. Furthermore, foreign material in a processed product is highly undesirable to consumers, since it may pose a health hazard.

Currently, a number of methods are used to remove foreign material from harvested root crops, such as hand sorting, use of mechanical coils or by flotation. However, these methods tend to add to the handling of the product and may cause physical damage to the crops. Water based separation techniques are undesirable because it is preferable to keep crops dry prior to storage to avoid rot.

Optical sorting is currently used to sort a variety of materials such as grapes, frozen prepared vegetables and waste materials for recycling. However, sorting of root crops presents additional challenges not faced in any of these areas, since any sorting mechanism used to handle harvested root crops must be capable of differentiating between a dirt clod or stone and a dirt-covered potato or onion. For example, in recycling applications, an optical sorter may identify image areas or pixels to be rejected from a flow of material and then activate air jets to blow the rejected material as it passes by jet orifices. In such an application the material to be sorted is well known, for example, paper, PET or PE plastics, and has a well-defined spectral signature and contamination of the background is not an issue. However, the spectral signature of crops such as potatoes is not as well-defined as that of synthetic materials such as plastics, and when the product is covered in dirt, it becomes even more difficult to distinguish between crops and foreign material. Additionally, as sorting root crops is a high volume application, it is desirable that foreign material can be identified in a bulk mass flow of the crop, even when objects are touching, without requiring singulation or individualisation of the product. This is because singulation is generally done using a high speed feed which can damage the product. Furthermore, high-speed conveyors are not suited to handling of a dirty product such as harvested root crops. Other singulation means use roller tables and/or conveying belts with divisions to separate individual objects. These methods greatly reduce the volume capacity of the process and are therefore undesirable.

International Patent Application Publication No. WO 2007/041753 relates to hyperspectral imaging of contaminants in products and processes of agriculture. Methods are described for assessing the characteristics of a sample such as grapes using NIR reflectance range spectroscopy. The method can be used to assess the presence of "matter other than grape" in a sample, including the presence of infective agents such as fungus. Because grapes are not typically dirty, this method would not be capable of differentiating between dirty crops and dirt clods. Additionally, grapes are less easily bruised than root crops such as potatoes, because of their structure and relative mass, and since they are typically crushed immediately after sorting, bruising or other damage is not of concern.

US Patent Application No. US2012/0074047 discloses a sorting method and apparatus for sorting foreign matter from a flow. Identified objects are characterised as foreign matter when the reflectance intensities at at least two different wavelengths fall within a predetermined region of a reference intensity profile. This method differentiates between good product and foreign material by mapping the ratios of two or more wavelength reflectance intensities and identifying the area of the map within which good product falls. Any objects which have a reflectance intensity ratio that falls outside this area are considered to be foreign material, which can be ejected later in the process. According to this process, objects with dirt attached would map to both the good product and foreign material areas of the map, thereby making the decision process less certain. Furthermore, dirt-contaminated objects will reflect a combined signal when the dirt covering is thin and both dirt and good root crop will reflect partial signals to the camera pixel detector. This combined signal will not fall neatly into either the good product or foreign material areas of the map, again making the decision as to whether to reject an object more difficult.

It is therefore desirable to provide a method and apparatus for handling high volumes of a harvested root crop, which is capable of distinguishing between foreign material, such as dirt clods and stones, and dirt-covered crops and which causes minimal damage to the crops. It is also desirable to provide a method and apparatus which can identify rot or green on root crops.

SUMMARY OF THE INVENTION

According to an aspect of the present invention, there is provided a method for handling harvested root crops, comprising:
  optically imaging a bulk flow of a harvested root crop to produce image data;
  analysing the image data to identify discrete objects within the bulk flow;
  categorising each identified object as either acceptable or unacceptable based on a comparison with at least one discriminator;
  removing objects categorised as unacceptable from the bulk flow to provide a sorted flow of the harvested root crop.

An advantage of this arrangement is that discrete objects in a bulk mass flow may be identified, even when the objects are touching or covered in dirt or other contaminants. This allows individual objects to be evaluated as a whole and then categorised as acceptable or unacceptable, rather than simply comparing individual pixels of image data to a spectral signature of a desirable material and rejecting material which does not meet the criteria applied. In a case where material is rejected based on individual pixels, dirt-covered crops could be erroneously identified as dirt clods and rejected unnecessarily. The present invention solves this problem by analysing the image data to identify objects within the flow and categorising each object as a whole, rather than assessing pixels individually. The invention is therefore suitable for use in handling root crops immediately after harvesting or direct from harvest storage, when the product may be contaminated with dirt. The invention may also be implemented at the receiving point of root crop processing plants where the crop may be received in a washed or unwashed state.

An object may be categorised as unacceptable if the comparison indicates that the object is not a root crop. Additionally or alternatively, an object may be categorised as unacceptable if the comparison indicates that the object is a rotted or defective root crop. An object may be categorised as acceptable if the comparison indicates that the object is a good root crop. The term "good root crop" as used herein refers to root crop that is substantially free of defects.

The at least one discriminator may comprise single or multiple dimensional thresholds, support vector machines and/or multivariate approaches, such as PCS, PLS etc.

Optically imaging the bulk flow of the harvested root crop may comprise using hyper-spectral imaging to generate a plurality of image pixels, each having a spectral profile. Each pixel may be classified as corresponding to or representing a particular material or combination of materials based on the spectral profile. Pixels may be classified as corresponding to root crop, such as potato, or other materials such as dirt, stone or wood. The term "dirt" as used herein is intended to encompass soil, sand, mud and other similar contaminants that may be adhered to the outer surfaces of harvested root crops. Pixels classified as corresponding to root crop may be further classified as corresponding to good root crop, or bad root crop. Bad root crop may include, for example, rotted root crop or green root crop. In other embodiments, multi-spectral imaging may be used.

The hyper-spectral imaging may be carried out at wavelengths between 470 nm and 2000 nm. The hyper-spectral imaging may be carried out in two selective spectral ranges, one visible range and one NIR range. In one embodiment suitable for handling potatoes, a sub-range of the visible spectrum between 750 nm and 1100 nm is divided into 16 equal bands of light and a sub-range of the NIR spectrum between 1100 nm and 1300 nm is divided into a further 16 equal bands. The spectral information may then be processed using one of a number of spectral analysis techniques such as multi-variant analysis, principle component analysis, support vector machine analysis, an algorithmic decision tree of multiple spectral component comparisons and ratios or colour space mapping using selected 2D, 3D or n-dimensional colour spaces or clouds.

In one embodiment, categorising an object as unacceptable comprises comparing the spectral profile of the pixels of that object with a spectral signature of a "never acceptable" material, that is a material which can never form part of an acceptable object. Such materials may include, for example, stone or wood, but not dirt, since dirt is acceptable when attached to a root crop. If the spectral profile of a pixel is found to match the signature of a never acceptable material, the object may be categorised as unacceptable and removed from the flow. This method is not suitable for rejection of dirt clods, since a pixel classified as dirt might form part of an acceptable object, such as a dirt-covered potato.

The step of analysing the image data may comprise grouping the image pixels as objects based on at least one location or proximity criterion.

In one embodiment, a vertex search method is used to group pixels as objects. The image data may be analysed to detect sharp angles or vertices which are typically formed at a point of contact between generally oval or round objects such as potatoes. Using this method, opposing sharp angles are identified as pinch points and a line may be drawn between these two vertices. Pixels on one side of the line may then be grouped together as a first object and pixels on the other side of the line may be grouped together as a second object. Each object may then be categorised as acceptable or unacceptable.

In another embodiment, a pixel propagation method may be used. A first pixel classified as representing good root crop is selected. Pixels adjacent to the first pixel are analysed and any adjacent pixel which corresponds to a "possibly acceptable" material is included in a search region. Possibly acceptable materials are those which may form part of an acceptable object and may include good root crop, bad root crop, dirt, and/or other materials that may become attached to root crops. They do not include never acceptable materials, such as stone or wood, which can never form part of an acceptable object. A next set of pixels around the search region are then analysed and added to the search region if they match the criteria. The process repeated in an iterative manner within a specific radius or until an object boundary is detected. An object boundary may be detected when the edge of the object is reached (that is, by non-presence of pixels corresponding to possibly acceptable materials such as root crops or dirt) or when pixels of another material, such as stone or wood, are encountered. The search radius may be defined depending on the type of crop being analysed and the specific crop conditions, in order to avoid inclusion of dirt clods in the search region. Once the process has completed, the pixels included in the search region are grouped together as an object which may then be categorised. In this way, the search region could grow from a single pixel of visible potato in order to encompass an entire dirt-covered potato. This embodiment is particularly useful in situations where the image data is complex with a very high volume of product, in which case the vertex search method may have difficulty matching vertices.

Categorising each identified object as either acceptable or unacceptable may comprise:
  generating a statistical profile of the object based on the spectral profile of the pixels grouped within the object; and
  comparing the statistical profile of the object with at least one qualitative or quantitative threshold.

In one embodiment, generating the statistical profile of the object comprises performing a statistical analysis on the pixels grouped within the object to determine the fraction of those pixels that correspond to good root crop. A determination may also be made of the fraction of the pixels that correspond to other materials such as dirt, rotted root crops or green root crops. The determined fractions may then be compared to a threshold fraction of pixels that allows the object to be categorised as acceptable. For example, an object may be considered acceptable if 80% of the pixels correspond to good root crop, 15% of the pixels correspond to dirt and 5% of the pixels correspond to green root crop.

As set out above, if any pixels are determined to correspond to a never acceptable material, the object may be categorised as unacceptable.

Categorising each identified object may further comprise:
  generating spatial information associated with the identified object based on the distribution of pixels grouped within the object; and
  comparing the spatial information with at least one spatial threshold.

The spatial information generated may comprise information relation to the size, length, width, aspect ratio and/or shape of the identified object. The spatial information may be compared to thresholds regarding size and shape of typical root crops. For example, where the root crops being sorted are potatoes, the spatial information for each object identified in the flow is compared to at least one threshold corresponding to the size and/or shape of typical potatoes.

The statistical profile and/or spatial information generated for each object may be used to selectively process the object. As already outlined above, if an object is categorised as unacceptable, it is removed from the flow of crop. However, the statistical profile and/or spatial information of objects classified as acceptable may be used as an indication of other characteristics of the object, such as size, shape or quality, and the flow of crop may be further segregated on this basis.

In other applications, the length, width or aspect ratio may be calculated for each object based on the spatial information generated for the object. Information on the average characteristics of crops in a particular batch may be accumulated and used to determine suitability for various end uses. For example, long potatoes may be ideal for use in French fry production, whereas small potatoes may be more appropriate for use as salad potatoes.

The step of optically imaging may be performed as the bulk flow of the harvested root crop is in free-fall. When dirt-covered root crops are passed along a conveyor belt, the conveyor becomes contaminated and cannot be kept clean. This can complicate the sorting process as it become more difficult to distinguish crops from the background.

Imaging the flow of crop as it free-falls off the end of a conveyor eliminates these difficulties. An optic background may be provided behind, but not in contact with, the flow of product.

The method may further comprise the step of storing the harvested root crop before or after the steps of optically imaging, analysing, categorising and removing. The steps of optically imaging, analysing, categorising and removing may be considered a sorting operation. The sorting operation may be carried out prior to storing the harvested root crop, so that unacceptable objects such as foreign material and rotted crops are not stored, thereby reducing transport and storage costs and avoiding deterioration of the crop during storage due to the presence of rot or foreign material. Alternatively or additionally, the sorting operation may be carried out after storing the crop for a period of time, thereby removing any additional foreign material prior to further processing of the crop and removing any crops which have rotted during storage. Because root crops are typically stored for a period of a number of months, a single sorting apparatus may be used to carry out both pre- and post-storage sorting.

According to another aspect of the present invention, there is provided an apparatus for sorting harvested root crops, comprising:
  means for optically imaging a bulk flow of a harvested root crop to produce image data;
  means for analysing the image data to identify discrete objects within the bulk flow;
  means for categorising each identified object as either acceptable or unacceptable based on a comparison with at least one discriminator;
  means for removing objects classified as unacceptable from the bulk flow to provide a sorted flow of the harvested root crop.

BRIEF DESCRIPTION OF THE DRAWINGS

FIG. 8b is a side elevation of the apparatus shown in FIG. 8a.

DETAILED DESCRIPTION OF THE DRAWINGS

Figure 1:
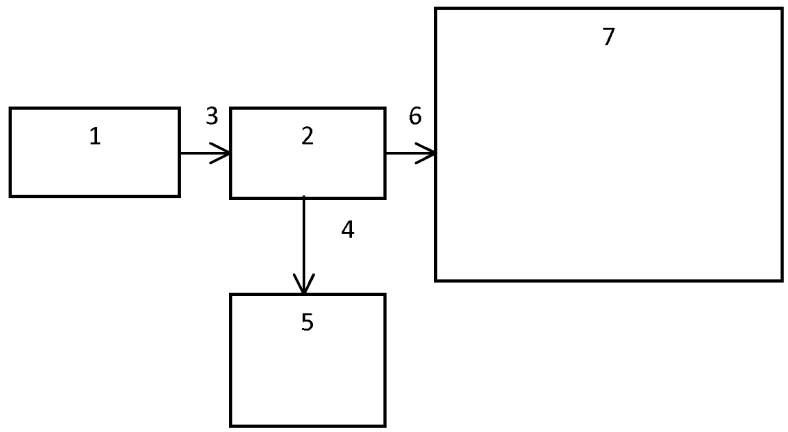
FIG. 1 is a schematic diagram of a method for handling harvested root crops according to a first embodiment of the present invention.

FIG. 1 illustrates a method of handling harvested root crops such as potatoes according to a first embodiment of the invention. The embodiment will be described with reference to potatoes, but is equally applicable to other root crops.

Figure 7:
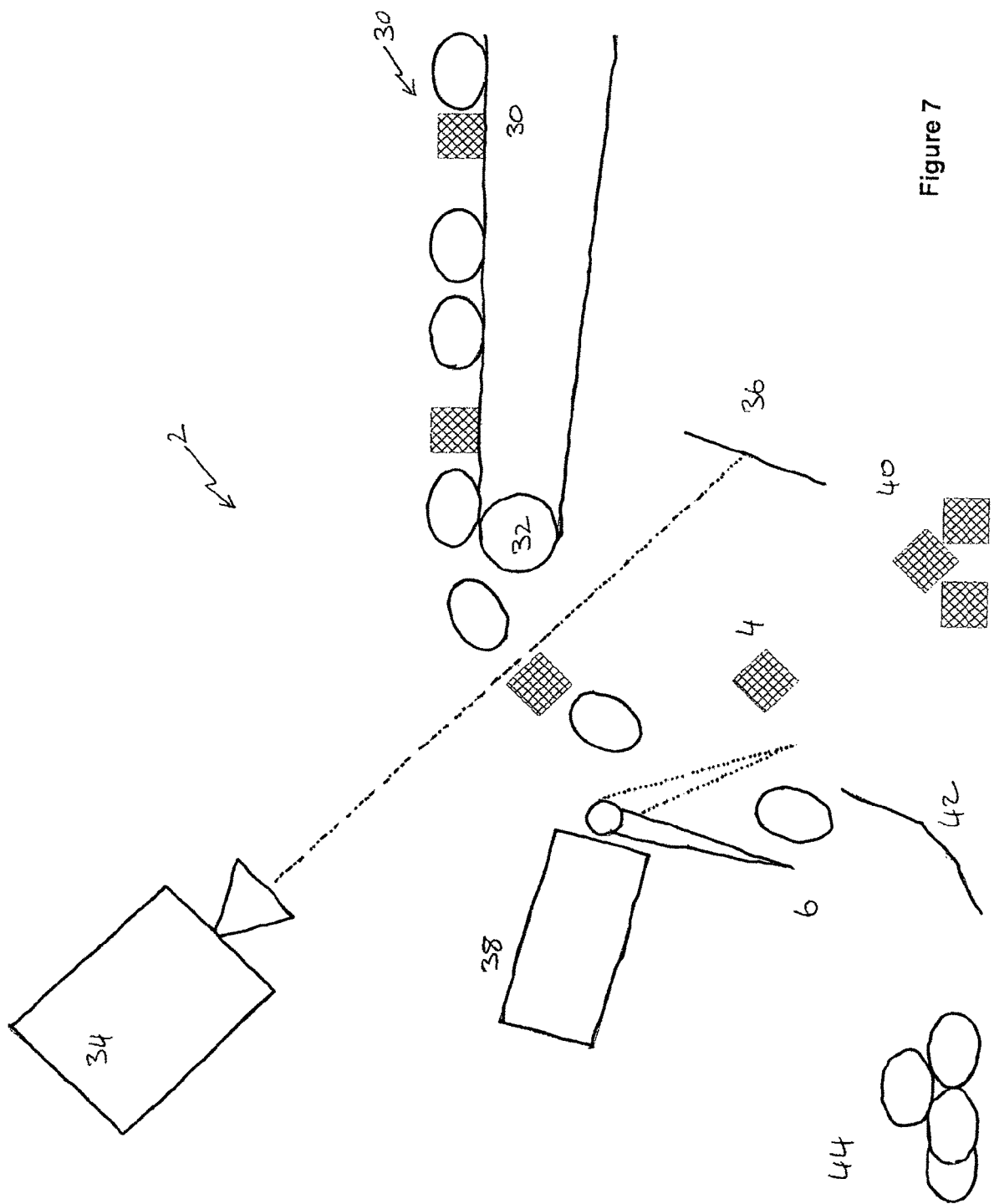
FIG. 7 is a schematic diagram of a portion of an apparatus according to an embodiment of the present invention.

Potatoes are harvested by a harvester 1 and transported to a sorter 2. As shown in FIG. 7, the sorter 2 is provided with a bulk flow 3 of the harvested root crop, by means of a conveyor belt 30. The sorter optically images the bulk flow of the harvested potatoes as it falls off the end 32 of the conveyor 30 using a hyper-spectral imaging system operating at wavelengths from 740 nm to 1050 nm. Visible radiation is directed at the free falling product 3 and reflected by an optic background reflector 36 to generate image data which comprises a plurality of image pixels. Each pixel has a spectral profile based on the reflectance intensity of the material represented by that pixel. Each pixel is classified as corresponding to a particular material based on its spectral profile. Pixels are classified as corresponding to good potato, rotted potato, green potato, dirt, stone, wood or other material.

Figure 6C:
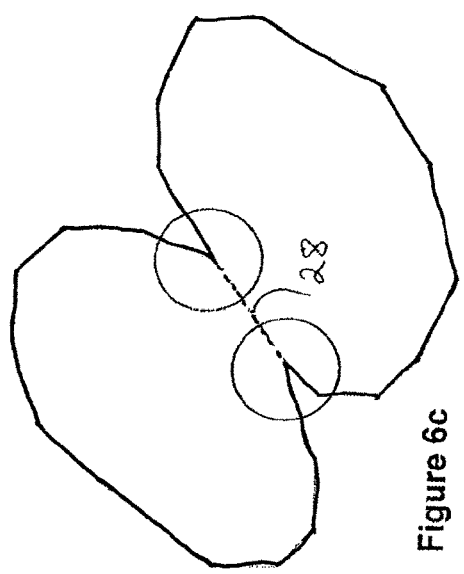
FIGS. 6a to 6d illustrate a vertex search method for grouping pixels as objects.
Figure 6B:
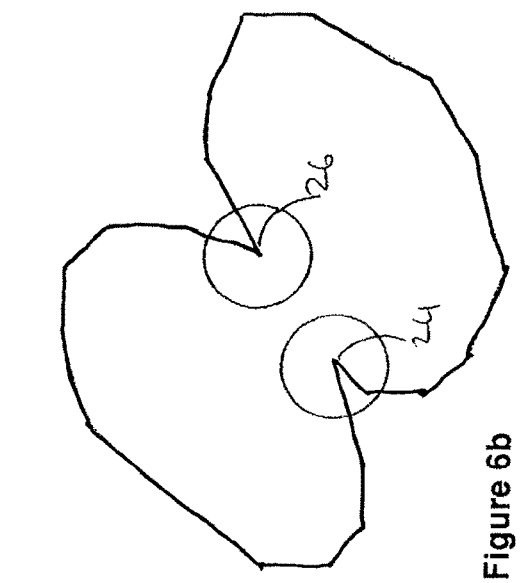
Figure 6A:
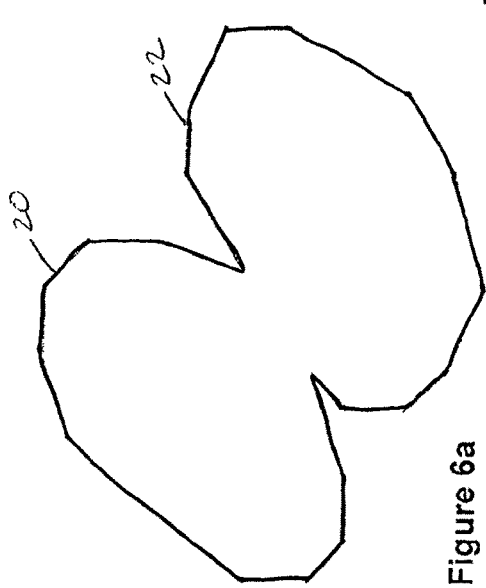
Figure 6D:
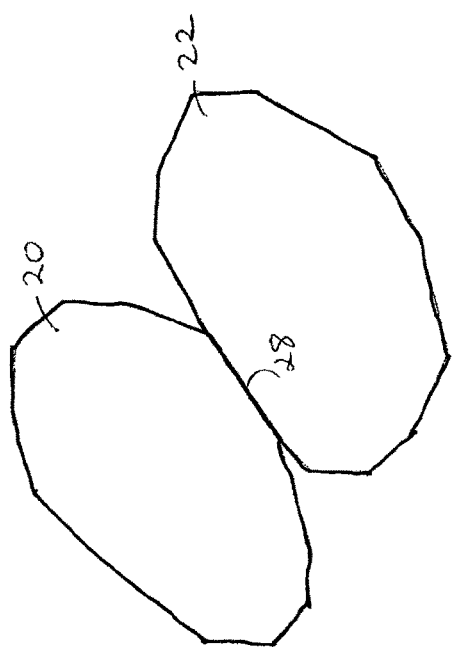

The image pixels are the analysed to identify discrete objects within the bulk flow. A vertex search method as illustrated in FIGS. 6a to 6d is used to group pixels as objects. An image comprising a pair of touching objects 20, 22 is shown in FIG. 6a. The image data is analysed to detect sharp angles 24, 26 or vertices which are typically formed at a point of contact between potatoes as shown in FIG. 6b. Opposing sharp angles 24, 26 are identified as pinch points and a line 28 is drawn between the two vertices. Pixels on one side of the line 28 are then grouped as a first object 20 and pixels on the other side of the line are grouped as a second object 22.

If a very high volume of potatoes is being processed, it may be difficult to identify vertices in the image data. In this case, an iterative process is used to identify objects within the image data. A first pixel classified as representing good potato is selected. Pixels adjacent to the first pixel are analysed, and any adjacent pixel which corresponds to good potato, bad potato or dirt is included in a search region. A next set of pixels adjacent to the pixels within the search region are then analysed and added to the search region if they match the criteria. The process is repeated in an iterative manner until a specific radius is reached or an object boundary is detected. The pixels included in the search region are then grouped together as an object.

Each identified object is then categorised as either acceptable or unacceptable based on a comparison with at least one object threshold. The categorisation process comprises generating a statistical profile of the object based on the spectral profiles of the pixels which have been grouped together, by performing a statistical analysis of the pixels to determine the fraction or percentage of pixels that correspond to good potato. The fraction or percentage of pixels that correspond to each of dirt, rotted potatoes or other materials such as stone or wood is also determined. The statistical profile of the object is then compared with a quantitative threshold. If the fraction or percentage of pixels which correspond to good potato meets or exceeds the threshold, the object is categorised as acceptable. If the fraction or percentage does not meet the threshold, the object is classified as unacceptable. If any of the pixels correspond to stone or wood, the object may also be classified as unacceptable since these materials, unlike dirt, can never combine with potato to form an acceptable object.

The categorisation process further comprises generating spatial information associated with the identified object based on the distribution of pixels grouped within the object. For example, the size or shape of the object may be identified and compared with the size or shape of a typical potato. If the spatial information falls within allowed thresholds, the object is classified as acceptable. Any objects classified as unacceptable 4 are removed from the bulk flow by means of ejector actuators 38 which are operable to flip or direct unacceptable objects 40 past an accept separator 42 into a reject flow 4. Good product 44 is allowed to pass by the ejector actuators, to provide a sorted flow 6 of the harvested potatoes.

The sorted flow 6 of the harvested potatoes is directed to a storage facility 7 and is stored there for a period of time.

Figure 2:
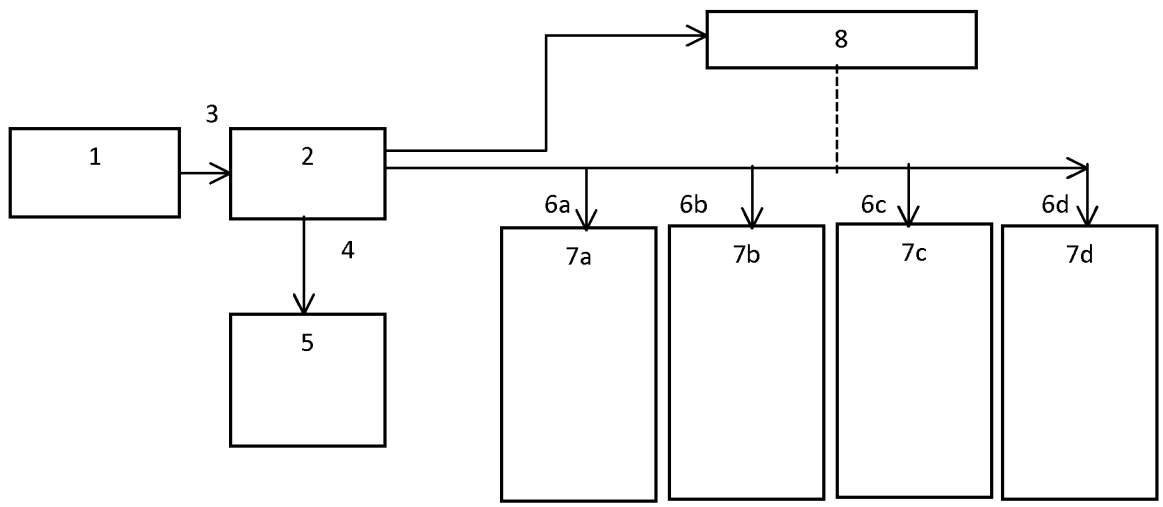
FIG. 2 is a schematic diagram of a method of handling harvested root crops according to a second embodiment of the present invention.

FIG. 2 illustrates a method of handling harvested root crops such as potatoes according to a second embodiment of the invention. In this embodiment, statistical information about the quality of the sorted product is transmitted to a SCADA control unit 8. This SCADA control unit can then direct the product to one of a selection of storage bunkers 7a, 7b, 7c, 7d, by means of transport conveying systems 6a, 6b, 6c, 6d. In the embodiment shown, potatoes are segregated into four different sorted flows 6a, 6b, 6c and 6d and directed to different storage facilities 7a, 7b, 7c and 7d based on size, shape, quality or other bulk characteristic. This allows crops which are suitable for different end uses to be segregated prior to storage.

Figure 3:
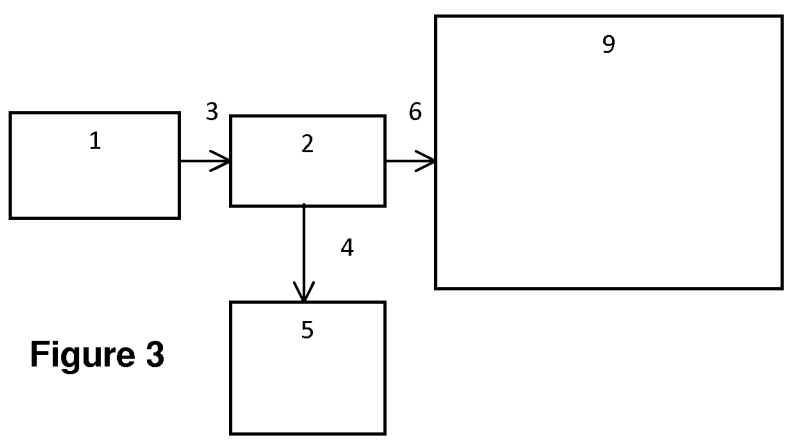
FIG. 3 is a schematic diagram of a method of handling harvested root crops according to a third embodiment of the present invention.

FIG. 3 illustrates a method of handling harvested root crops such as potatoes according to a third embodiment of the invention. In this embodiment, the sorted flow 6 of the crop is directed to a processing unit 9 for further processing, such as washing, peeling, chipping or packaging.

Figure 4:
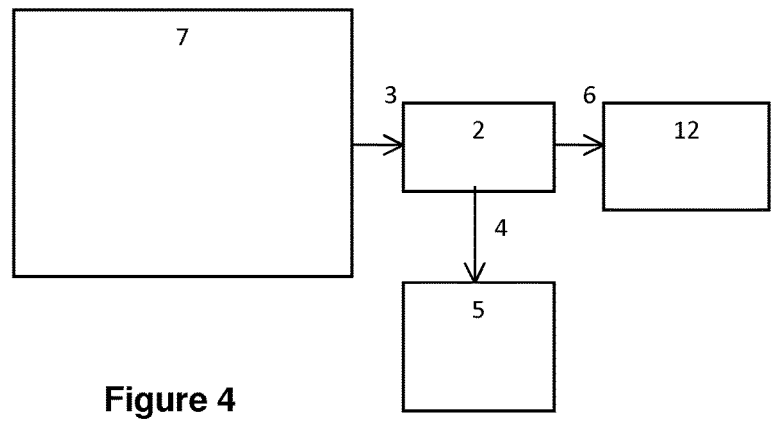
FIG. 4 is a schematic diagram of a method of handling harvested root crops according to a fourth embodiment of the present invention.

FIG. 4 illustrates a method of handling harvested root crops such as potatoes according to a fourth embodiment of the invention. In the embodiment shown in FIG. 4, the crop is stored prior to sorting. After storing the crop for a period of time, a bulk flow 3 of the stored crop is directed out of the storage facility to the sorter 2. The sorter 2 performs the steps of optically imaging, analysing, categorising and removing on the bulk flow of the stored crop, as described above with reference to FIG. 1. The sorted flow 6 of the root crop is then directed onward for further processing 12.

Figure 5:
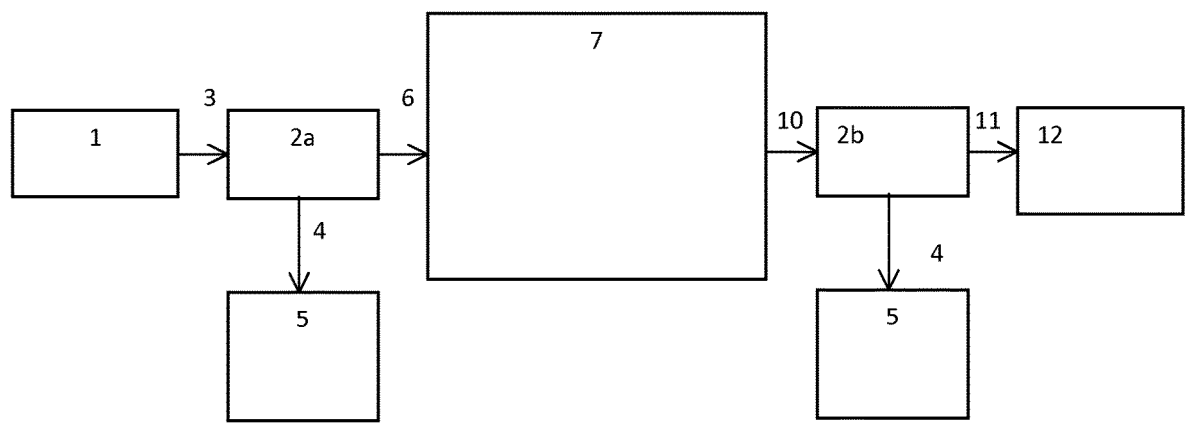
FIG. 5 is a schematic diagram of a method of handling harvested root crops according to a fifth embodiment of the present invention.

FIG. 5 illustrates a method of handling harvested root crops such as potatoes according to a fifth embodiment of the invention. In this embodiment, the harvested root crop is sorted at sorter 2a prior to storage, as described above with reference to FIG. 1. In addition, after storing the crop in storage facility 7 for a period of time, a bulk flow 10 of the stored crop is directed to a sorter 2b, where an additional sorting operation is carried out. This involves repeating the steps of optically imaging, analysing, categorising and removing on the bulk flow of the stored crop, as described above with reference to FIG. 1. As with FIG. 5, the sorted flow 11 of the root crop is then directed onwards for further processing. Because the crop is typically stored for a period of time of the order of several months, the same sorting apparatus may be used as sorter 2a and sorter 2b.

Figure 8A:
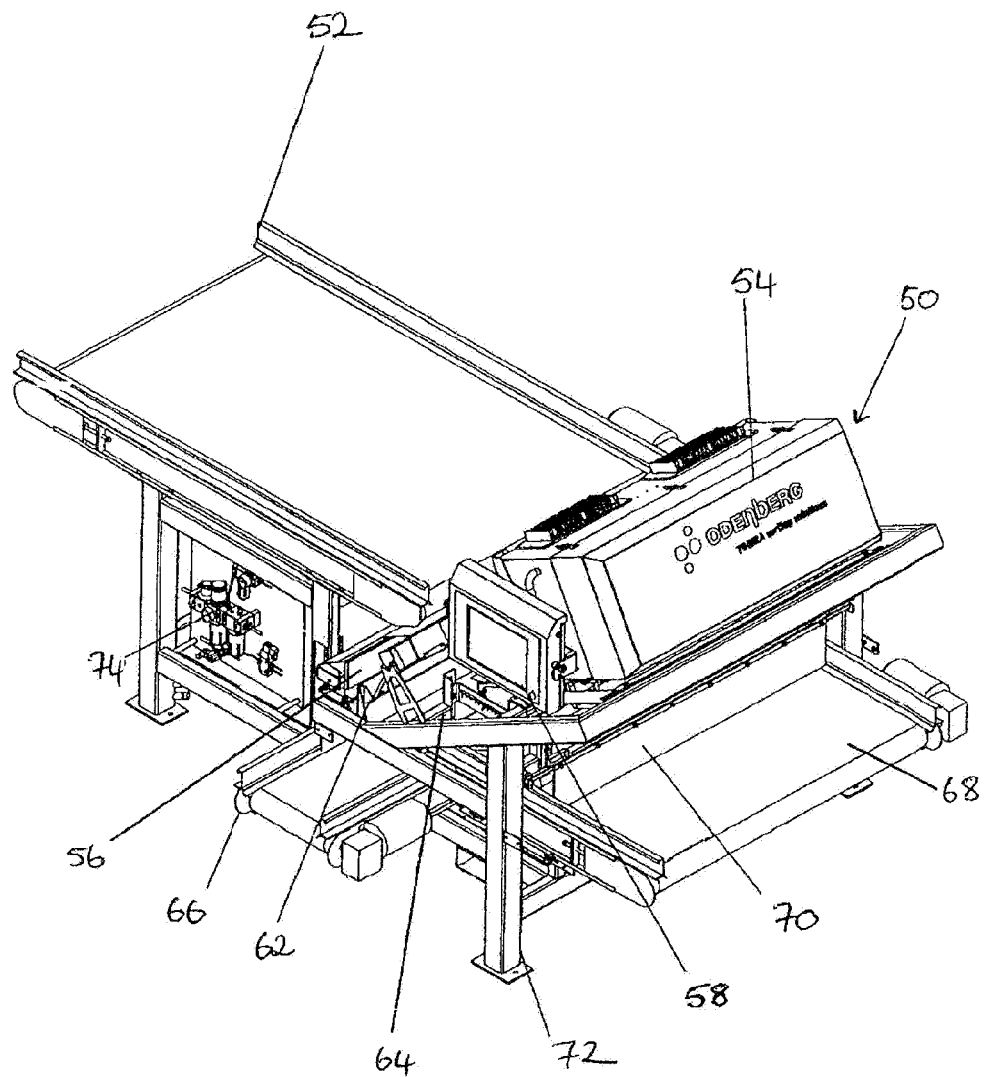
FIG. 8a is an isometric view of an apparatus according to an embodiment of the present invention.
Figure 8B:
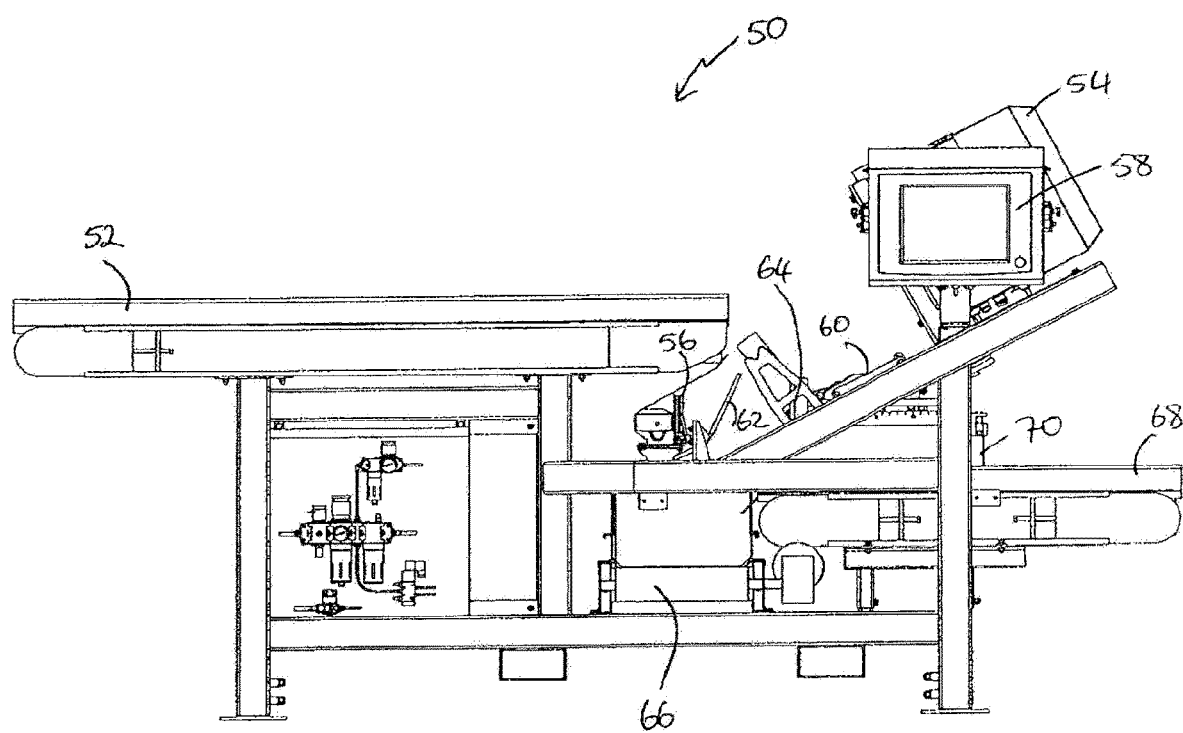

An apparatus 50 for handling harvested root crops according to an embodiment of the invention is shown in FIGS. 8a and 8b. The apparatus includes a mainframe assembly 72 on which is provided an infeed conveyor 52 for providing a bulk flow of a harvested root crop. A scanner box 54 and an optic background 56 are configured to optically image a bulk flow of a harvested root crop to produce image data. The scanner box 54 is also configured to analyse the image data to identify discrete objects within the bulk flow and to categorise each identified object as either acceptable or unacceptable based on a comparison with at least one discriminator. A touchscreen 58 is configured to allow a user to interact with the scanner box. The apparatus further comprises a rejector assembly 60, a reject guard 62 and an accept separator 64 configured to remove objects categorised as unacceptable from the bulk flow. When an object is categorised as unacceptable, one or more ejector actuators provided on the rejector assembly are actuated to deflect the object past the accept separator onto a reject conveyor assembly 66. The reject guard 62 prevents rejected objects from hitting the optic background 56. Good product is allowed to pass by the rejector assembly past the accept separator and onto an accept conveyor assembly 68 to provide a sorted flow of root crops. A slow down curtain 70 slows down the product as it moves along the accept conveyor 68. A services panel 74 is provided to supply air and water to the apparatus as necessary.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method for handling harvested root crops, comprising:

optically imaging a bulk flow of a harvested root crop using hyper-spectral or multi-spectral imaging to generate a plurality of image pixels, each of the pixels having a spectral profile based on a reflective intensity of a material represented by the pixel;

classifying each image pixel by the material or combination of materials it represents;

analysing the image pixels to identify discrete objects within the bulk flow;

generating a statistical profile of each identified object by performing a statistical analysis of classified pixels grouped within the object;

categorising each identified object as either acceptable or unacceptable by comparing the statistical profile of the object with at least one qualitative or quantitative threshold; and removing objects categorised as unacceptable from the bulk flow to provide a sorted flow of the harvested root crop;

wherein the at least one quantitative threshold is a fraction of pixels that correspond to good root crop.

2. A method as claimed in claim 1, wherein an object is categorised as unacceptable if the comparison indicates that the object is not a root crop.

3. A method as claimed in claim 1, wherein an object is categorised as unacceptable if the comparison indicates that the object is a rotted or defective root crop.

4. A method as claimed in claim 1, wherein an object is categorised as acceptable if the comparison indicates that the object is a good root crop.

5. A method as claimed in claim 1, wherein analysing the image pixels comprises grouping the image pixels as objects based on at least one location or proximity criterion.

6. A method as claimed in claim 5, wherein the image pixels are grouped as objects based on a vertex search method.

7. A method as claimed in claim 5, wherein the image pixels are grouped as objects based on a pixel propagation method.

8. A method as claimed in claim 1, wherein the step of categorising each identified object further comprises:

generating spatial information associated with the identified object based on the distribution of pixels grouped within the object; and comparing the spatial information with at least one spatial threshold.

9. A method as claimed in claim 8, wherein the at least one spatial threshold is associated with a size or shape of a root crop.

10. A method as claimed in claim 1, further comprising:

selectively processing the bulk flow based on:

the statistical profile associated with each identified object;

spatial information associated with each identified object; or the statistical profile and the spatial information associated with each identified object.

11. A method as claimed in claim 10, wherein the selectively processing comprises segregating the flow of crop based on a determined size, shape or quality.

12. A method as claimed in claim 1, wherein the step of optically imaging is performed as the bulk flow of the harvested root crop is in free-fall.

13. A method as claimed in claim 1, further comprising a step of storing the harvested root crop before or after the steps of optically imaging, analysing, categorising and removing.

14. A method as claimed in claim 13, further comprising:

directing the sorted flow of the harvested root crop into a storage facility; and storing the crop in the storage facility for a period of time.

15. A method as claimed in claim 13, further comprising:

after storing the crop for the period of time, directing a bulk flow of the stored crop out of the storage facility;

performing the steps of optically imaging, analysing, categorising and removing on the bulk flow of the stored crop.

16. A method as claimed in claim 1, wherein the step of generating a statistical profile comprises performing a statistical analysis of the pixels to determine the fraction or percentage of pixels that correspond to an acceptable object.

17. An apparatus for handling harvested root crops, comprising:

means for classifying each image pixel by the material or combination of materials it represents;

means for optically imaging a bulk flow of a harvested root crop using hyper- spectral or multi-spectral imaging to generate a plurality of image pixels, each of the pixels having a spectral profile based on a reflective intensity of a material represented by the pixel;

means for analysing the image pixels to identify discrete objects within the bulk flow;

means for generating a statistical profile of each identified object by performing a statistical analysis of the classified pixels grouped within the object;

means for categorising each identified object as either acceptable or unacceptable by comparing the statistical profile of the object with at least one qualitative or quantitative threshold;

means for removing objects categorised as unacceptable from the bulk flow to provide a sorted flow of the harvested root crop;

wherein the at least one quantitative threshold is a fraction of pixels that correspond to good root crop.

18. An apparatus as claimed in claim 17, wherein the means for generating a statistical profile comprises performing a statistical analysis of the pixels to determine the fraction or percentage of pixels that correspond to an acceptable object.

* * * * *